US012344282B2

(12) United States Patent
Abe et al.

(10) Patent No.: US 12,344,282 B2
(45) Date of Patent: Jul. 1, 2025

(54) APPARATUS FOR SWITCHING CONTROL BETWEEN AUTOMATIC DRIVING AND MANUAL DRIVING IN VEHICLES

(71) Applicant: SUBARU CORPORATION, Tokyo (JP)

(72) Inventors: Tomohiro Abe, Tokyo (JP); Fumiya Sato, Tokyo (JP); Mika Suzuki, Tokyo (JP); Hiroki Marumo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 275 days.

(21) Appl. No.: 17/866,254

(22) Filed: Jul. 15, 2022

(65) Prior Publication Data
US 2023/0034419 A1 Feb. 2, 2023

(30) Foreign Application Priority Data
Jul. 28, 2021 (JP) ................................. 2021-122849

(51) Int. Cl.
*B60W 60/00* (2020.01)
*B60W 40/02* (2006.01)
(Continued)

(52) U.S. Cl.
CPC ........ *B60W 60/0059* (2020.02); *B60W 40/02* (2013.01); *B60W 40/08* (2013.01);
(Continued)

(58) Field of Classification Search
CPC .. B60W 60/0059; B60W 40/02; B60W 40/08; B60W 50/0098; B60W 60/0053;
(Continued)

(56) References Cited

U.S. PATENT DOCUMENTS

2016/0179092 A1* 6/2016 Park ..................... B60W 30/12
701/23
2017/0349186 A1* 12/2017 Miller ................... B60W 50/14
(Continued)

FOREIGN PATENT DOCUMENTS

| JP | 2017-197183 A | 11/2017 |
| JP | 2018-083517 A | 5/2018 |
| WO | 2017/168739 A1 | 10/2017 |

OTHER PUBLICATIONS

Office Action issued in the corresponding Japanese Patent Application No. 2021-122849 on Apr. 15, 2025.

*Primary Examiner* — Harry Y Oh
*Assistant Examiner* — Karston G. Evans
(74) *Attorney, Agent, or Firm* — Rimon P.C.

(57) ABSTRACT

A vehicle control apparatus includes one or more processors. The one or more processors execute determination as to whether a driving state of the vehicle involves difficulty in continuing the automatic driving. In a case where the driving state is determined as involving difficulty in continuing the automatic driving, the one or more processors execute determination on a difficulty level of operation authority transfer from the automatic driving to the manual driving on the basis of information regarding a surrounding environment of the vehicle, information regarding a driving skill of a driver, and information regarding an experience level of the driver of the operation authority transfer. The one or more processors execute setting of a driving-state condition for executing the operation authority transfer in accordance with the difficulty level. The one or more processors execute the operation authority transfer in a case where the driving-state condition is satisfied.

8 Claims, 9 Drawing Sheets

(51) Int. Cl.
*B60W 40/08* (2012.01)
*B60W 50/00* (2006.01)
(52) U.S. Cl.
CPC .... *B60W 50/0098* (2013.01); *B60W 60/0053* (2020.02); *B60W 60/0057* (2020.02); *B60W 2050/007* (2013.01); *B60W 2050/0083* (2013.01)
(58) Field of Classification Search
CPC ....... B60W 60/0057; B60W 2050/007; B60W 2050/0083; B60W 2556/10
See application file for complete search history.

(56) References Cited

U.S. PATENT DOCUMENTS

| | | | |
|---|---|---|---|
| 2019/0101916 A1 | 4/2019 | Sen et al. | |
| 2019/0146489 A1* | 5/2019 | Zaizen | B60W 60/0053 701/42 |
| 2019/0184898 A1* | 6/2019 | Zheng | B60W 50/14 |
| 2019/0324452 A1* | 10/2019 | Sato | B60W 50/10 |
| 2020/0064833 A1* | 2/2020 | Fox | B60W 60/0057 |
| 2022/0126878 A1* | 4/2022 | Moustafa | G08G 1/096741 |
| 2023/0026238 A1* | 1/2023 | Arima | B62D 6/003 |

* cited by examiner

| EVALUATION ITEM FOR DRIVING SKILL | EVALUATION LEVELS |
|---|---|
| STABILITY OF SPEED | 1-5 |
| DEGREE OF SUDDEN ACCELERATION OR SUDDEN DECELERATION | 1-5 |
| FREQUENCY OF SUDDEN ACCELERATION OR SUDDEN DECELERATION | 1-5 |
| STABILITY OF STEERING ANGLE | 1-5 |
| DEGREE OF SUDDEN STEERING | 1-5 |
| FREQUENCY OF SUDDEN STEERING | 1-5 |

FIG. 3

| EVALUATION ITEM FOR EXPERIENCE LEVEL OF OPERATION AUTHORITY TRANSFER | EVALUTION LEVELS |
|---|---|
| STABILITY OF STEERING ANGLE | 1-5 |
| PRESENCE OR ABSENCE OF SLIPPING OF WHEELS | 1-5 |
| CHANGE IN LONGITUDINAL ACCELERATION RATE | 1-5 |
| CHANGE IN LATERAL ACCELERATION RATE | 1-5 |
| SPEED | 1-5 |
| STEERING ANGLE | 1-5 |
| LONGITUDINAL ACCELERATION RATE | 1-5 |
| LATERAL ACCELERATION RATE | 1-5 |
| NUMBER OF TIMES OF EXPERIENCED OPERATION AUTHORITY TRANSFER | 1-5 |

FIG. 4

APPARATUS FOR SWITCHING CONTROL BETWEEN AUTOMATIC DRIVING AND MANUAL DRIVING IN VEHICLES

CROSS-REFERENCE TO RELATED APPLICATIONS

The present application claims priority from Japanese Patent Application No. 2021-122849 filed on Jul. 28, 2021, the entire contents of which are hereby incorporated by reference.

BACKGROUND

The technology relates to a vehicle control apparatus applicable to a vehicle having a driving mode that is switchable between automatic driving and manual driving.

A technique of automatically performing driving of a vehicle such as an automobile has been known. Such automatic driving is executed by acquiring information regarding a surrounding environment of the vehicle by means of a surrounding environment sensor or communication with an outside of the vehicle, and controlling a speed and a steering angle of the vehicle. Non-limiting examples of the surrounding environment sensor may include a camera, a radar, and a light detection and ranging (LiDAR). For such a vehicle that is able to perform the automatic driving, there has been proposed a technique of safely switching a driving mode of the vehicle between the automatic driving and manual driving.

For example, Japanese Unexamined Patent Application Publication (JP-A) No. 2017-197183 proposes a vehicle control apparatus adapted to appropriately switching a driving mode of a vehicle from automatic driving to manual driving. Specifically, JP-A No. 2017-197183 discloses a vehicle control apparatus that switches the driving mode of the vehicle from the automatic driving to the manual driving in a case where the vehicle performing the automatic driving reaches a predetermined initial switching position, and that is able to execute a control adapted to switching from automatic steering to manual steering and a control adapted to switching from automatic speed adjustment to manual speed adjustment independently of each other.

Japanese Unexamined Patent Application Publication (JP-A) No. 2018-083517 proposes a vehicle system adapted to preventing a driving state of a vehicle from being unstable upon switching from automatic driving to manual driving. Specifically, JP-A No. 2018-083517 discloses the following technique. When a driver operates a part of the vehicle such as a steering wheel, an accelerator pedal, or a brake pedal, a simulation traveling course is displayed on a display screen. The simulation traveling course is a simulation in which an object viewable in front from the driver's viewpoint position is reproduced. After the driver travels through the displayed simulation traveling course while operating the part such as the steering wheel, the automatic driving is canceled, and the driving mode is switched to the manual driving that reflects the content of the operation performed by the driver on the part such as the steering wheel.

SUMMARY

An aspect of the technology provides a vehicle control apparatus to be applied to a vehicle having a driving mode that is switchable between automatic driving and manual driving. The vehicle control apparatus includes one or more processors and one or more memories communicably coupled to the one or more processors. The one or more processors are configured to execute determination as to whether a driving state of the vehicle involves difficulty in continuing the automatic driving. The one or more processors are configured to execute, in a case where the driving state is determined as involving difficulty in continuing the automatic driving, determination on a difficulty level of operation authority transfer from the automatic driving to the manual driving on the basis of information regarding a surrounding environment of the vehicle, information regarding a driving skill of a driver who drives the vehicle, and information regarding an experience level of the driver of the operation authority transfer from the automatic driving to the manual driving. The one or more processors are configured to execute setting of a driving-state condition for executing the operation authority transfer in accordance with the difficulty level. The one or more processors are configured to execute the operation authority transfer in a case where the driving-state condition is satisfied.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 3 is an explanatory diagram illustrating an example of information regarding a driving skill of a driver stored in a driver database.

FIG. 4 is an explanatory diagram illustrating an example of information regarding an experience level of a driver of operation authority transfer stored in the driver database.

DETAILED DESCRIPTION

Upon transfer of operation authority from automatic driving to manual driving, one criterion may be whether a driver is able to follow, by the manual driving, a target operation amount set in the automatic driving. In such a case, depending on ability of the driver to adapt, the driver can make a mistake in a driving operation after the operation authority transfer has been performed, which can result in abrupt braking or abrupt turning of a steering wheel.

It is desirable to provide a vehicle control apparatus that allows for safe operation authority transfer in accordance with ability of a driver to adapt to switching from automatic driving to manual driving.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Overall Configuration of Vehicle

Described first is an example of a configuration of a vehicle to which a vehicle control apparatus according to an example embodiment of the technology is applicable.

Figure 1:
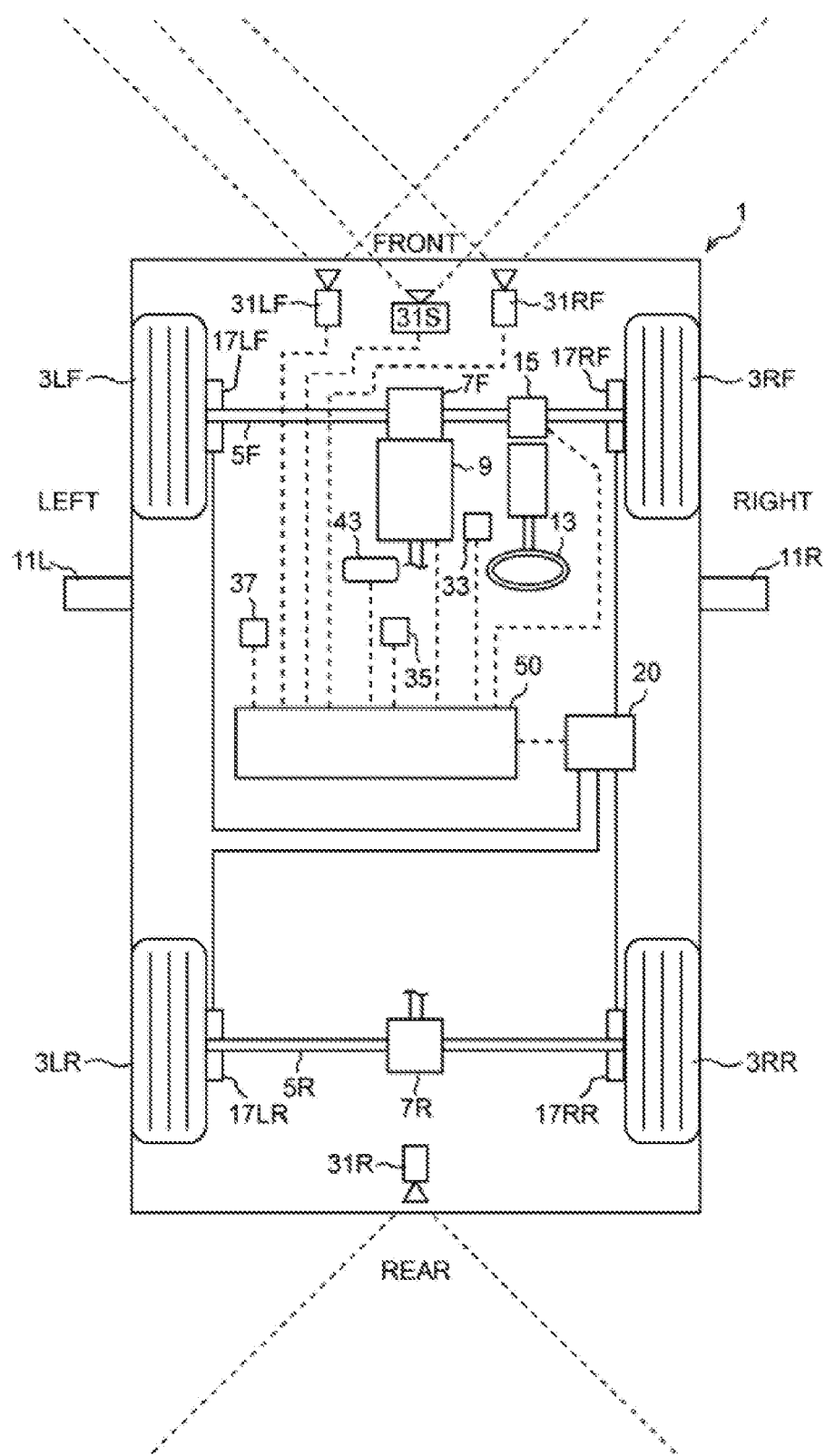
FIG. 1 is a schematic diagram illustrating a configuration example of a vehicle to which a vehicle control apparatus according to one example embodiment of the technology is applicable.

FIG. 1 is a schematic diagram illustrating a configuration example of a vehicle 1 including a control apparatus 50 to be applied to a vehicle. In one embodiment, the control apparatus 50 may serve as a "vehicle control apparatus".

The vehicle 1 illustrated in FIG. 1 may be configured as a four-wheel-drive vehicle that transmits driving torque to a left front wheel 3LF, a right front wheel 3RF, a left rear wheel 3LR, and a right rear wheel 3RR (hereinafter collectively referred to as "wheels 3" unless a distinction is to be made between them). The driving torque may be outputted from a driving force source 9 that generates driving torque of the vehicle 1. The driving force source 9 may be an internal combustion engine or a drive motor, or may include both the internal combustion engine and the drive motor. Non-limiting examples of the internal combustion engine may include a gasoline engine and a diesel engine.

The vehicle 1 may be, for example, an electric vehicle including two drive motors, i.e., a front wheel drive motor and a rear wheel drive motor; or an electric vehicle including drive motors corresponding to the respective wheels 3. In a case where the vehicle 1 is an electric vehicle or a hybrid electric vehicle, the vehicle 1 may be provided with, for example, a secondary battery that stores electric power to be supplied to the drive motor, or an electric power generator that generates electric power to be used to charge the battery. Non-limiting examples of the electric power generator may include a motor and a fuel cell.

As equipment to be used for driving control of the vehicle 1, the vehicle 1 may include the driving force source 9, an electric steering system 15, and a brake device 20. The driving force source 9 may output the driving torque to be transmitted to a front-wheel drive shaft 5F and a rear-wheel drive shaft 5R via an unillustrated transmission and a front-wheel differential mechanism 7F and a rear-wheel differential mechanism 7R. Driving of components including the driving force source 9 and the transmission may be controlled by the control apparatus 50 including one or more electronic control units (ECUs).

The front-wheel drive shaft 5F may be provided with the electric steering system 15. The electric steering system 15 may include, for example, an unillustrated electric motor and an unillustrated gear mechanism. The electric steering system 15 may be controlled by the control apparatus 50 to adjust a steering angle of the left front wheel 3LF and the right front wheel 3RF. In a manual driving mode, the control apparatus 50 may control the electric steering system 15 on the basis of a steering angle of a steering wheel 13 operated by a driver who drives the vehicle 1. In an automatic driving mode, the control apparatus 50 may control the electric steering system 15 on the basis of a target steering angle set by the control apparatus 50.

A brake system of the vehicle 1 may be configured, for example, as a hydraulic brake system. The brake device 20 may adjust hydraulic pressure to be supplied to brake calipers 17LF, 17RF, 17LR, and 17RR provided on the left front wheel 3LF, the right front wheel 3RF, the left rear wheel 3LR, and the right rear wheel 3RR, respectively, to thereby generate braking force. Hereinafter, the brake calipers 17LF, 17RF, 17LR, and 17RR may collectively be referred to as "brake calipers 17" unless a distinction is to be made between them. In a case where the vehicle 1 is an electric vehicle or a hybrid electric vehicle, the brake device 20 may be used in combination with regenerative braking performed using the drive motor.

The control apparatus 50 may include one or more electronic control units that control driving of: the driving force source 9 outputting the driving torque for the vehicle 1; the electric steering system 15 controlling the steering angle of the steering wheel 13 or steered wheels; and the brake device 20 adjusting the hydraulic pressure to be supplied to the brake calipers 17. In one example, the control apparatus 50 may be configured to control driving of the transmission that changes in speed an output outputted from the driving force source 9 and transmits the driving torque changed in speed to the wheels 3. An example of a configuration of the control apparatus 50 will be described later in more detail.

The vehicle 1 may include front imaging cameras 31LF and 31RF, a rear imaging camera 31R, a LiDAR 31S, an in-vehicle imaging camera 33, a vehicle state sensor 35, a global positioning system (GPS) sensor 37, and a human machine interface (HMI) 43.

The front imaging cameras 31LF and 31RF, the rear imaging camera 31R, and the LiDAR 31S may serve as a surrounding environment sensor adapted to acquiring information regarding a surrounding environment of the vehicle 1. The front imaging cameras 31LF and 31RF may perform imaging of a region in front of the vehicle 1 to generate image data. The rear imaging camera 31R may perform imaging of a region in rear of the vehicle 1 to generate image data. The front imaging cameras 31LF and 31RF and the rear imaging camera 31R may each include an imaging sensor, such as a charged-coupled device (CCD) or a complementary metal-oxide-semiconductor (CMOS), and transmit the generated image data to the control apparatus 50.

In the vehicle 1 illustrated in FIG. 1, the front imaging cameras 31LF and 31RF may be configured as a stereo camera including a pair of left and right cameras, and the rear imaging camera 31R may be configured as a so-called monocular camera. However, in one example, the front imaging camera may be a monocular camera, and the rear imaging camera may be a stereo camera. Note that the rear imaging camera 31R is not necessarily provided. In addition, the vehicle 1 may further include a camera that is provided on a side-view mirror 11L to perform imaging of a left-rear region, or further include a camera that is provided on a side-view mirror 11R to perform imaging of a right-rear region.

The LiDAR 31S may transmit an optical wave and receive a reflected wave of the transmitted optical wave, and detect an object and a distance to the object on the basis of a time from transmission of the optical wave to reception of the reflected wave. The LiDAR 31S may transmit detection data to the control apparatus 50. For example, in addition to the above, the vehicle 1 may include one or more of radar sensors and ultrasonic sensors as the surrounding environment sensor adapted to acquiring the information regarding the surrounding environment. Non-limiting examples of the radar sensors may include millimeter-wave radars. For example, the vehicle 1 may further include a raindrop sensor as the surrounding environment sensor adapted to acquiring the information regarding the surrounding environment.

The in-vehicle imaging camera 33 may perform imaging of an inside of the vehicle 1 to generate image data. The in-vehicle imaging camera 33 may include an imaging device such as a CCD or a CMOS, and transmit the generated image data to the control apparatus 50. In the example embodiment, the in-vehicle imaging camera 33 may be so disposed as to perform imaging of an occupant riding the vehicle 1. The in-vehicle imaging camera 33 to be provided may be one in number, or may be two or more in number.

The vehicle state sensor 35 may include at least one sensor that detects an operation state and behavior of the vehicle 1. For example, the vehicle state sensor 35 may include one or more of a steering angle sensor, an accelerator position sensor, a brake stroke sensor, a brake pressure sensor, or an engine speed sensor. The vehicle state sensor 35 may thus detect the operation state of the vehicle 1, such as the steering angle of the steering wheel 13 or the steered wheels, an accelerator operation amount, a brake operation amount, or an engine speed. For example, the vehicle state sensor 35 may include one or more of a vehicle speed sensor, an acceleration rate sensor, an angular velocity sensor, or a wheel speed sensor. The vehicle state sensor 35 may thus detect the behavior of the vehicle 1, such as a vehicle speed, a longitudinal acceleration rate, a lateral acceleration rate, a yaw rate, or the number of rotations of the wheels 3. The vehicle state sensor 35 may transmit a sensor signal including the detected information to the control apparatus 50.

The GPS sensor 37 may receive satellite signals from GPS satellites. The GPS sensor 37 may transmit, to the control apparatus 50, position information of the vehicle 1 on map data included in the received satellite signals. In place of the GPS sensor 37, an antenna may be provided to receive satellite signals from another satellite system that identifies the position of the vehicle 1.

The HMI 43 may be driven by the control apparatus 50 to present various pieces of information to the driver by, for example, displaying an image or outputting sound. The HMI 43 may include, for example, a display provided in an instrument panel and a speaker provided in the vehicle 1. For example, the display may be a display of a navigation system. For example, the HMI 43 may include a head-up display (HUD) that superimposes an image on a scenery around the vehicle 1 and displays the superimposed image on a front window.

2. Control Apparatus to be Applied to Vehicle

Next, described in detail is the control apparatus 50 to be applied to a vehicle according to the example embodiment.

2-1. Configuration Example

Figure 2:
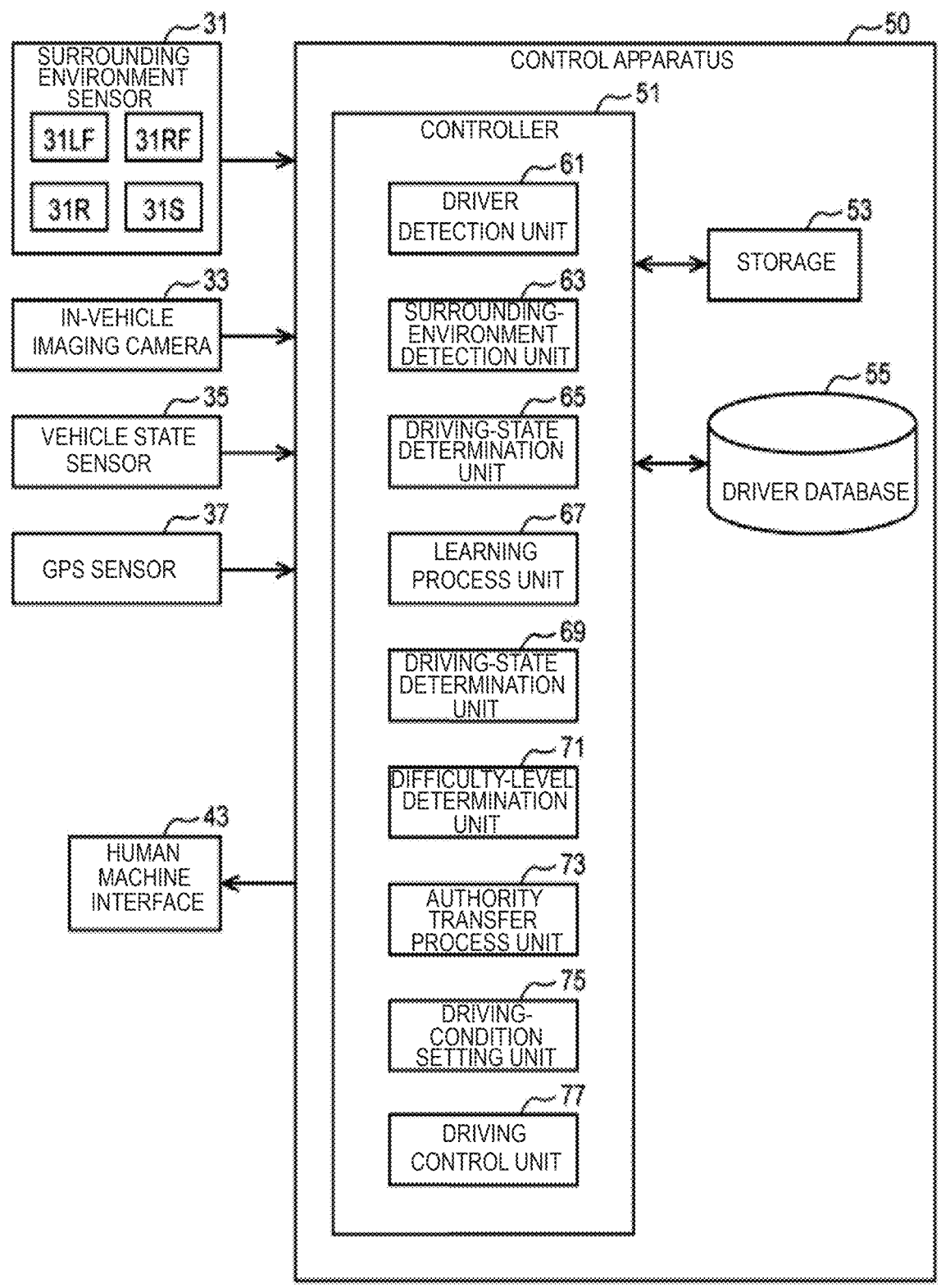
FIG. 2 is a block diagram illustrating a configuration example of the vehicle control apparatus according to one example embodiment.

FIG. 2 is a block diagram illustrating a configuration example of the control apparatus 50 according to the example embodiment.

The surrounding environment sensor 31, the in-vehicle imaging camera 33, the vehicle state sensor 35, and the GPS sensor 37 may be coupled to the control apparatus 50 directly or via a communication system such as a controller area network (CAN) or a local interconnect network (LIN). The HMI 43 may also be coupled to the control apparatus 50 directly or via a communication system such as a CAN or a LIN.

The control apparatus 50 may include a controller 51, a storage 53, and a driver database 55. The controller 51 may include one or more processors. Non-limiting examples of the one or more processors may include a central processing unit (CPU) or CPUs. The controller 51 may partially or entirely be updatable software such as firmware, or a program module to be executed in accordance with a command given from the CPU or the CPUs, for example. The storage 53 may be a memory. Non-limiting examples of the memory may include a random-access memory (RAM) and a read-only memory (ROM). Note that the storage 53 is not particularly limited in number or kind. The storage 53 may hold a computer program to be executed by the controller 51 and information to be used in a calculation process. Non-limiting examples of the information to be used in the calculation process may include various parameters, detection data, and calculation results.

The driver database 55 may include a rewritable storage device. Non-limiting examples of such a storage device may include a memory such as a RAM, a hard disk drive (HDD), a compact disk (CD), a digital versatile disk (DVD), a solid state drive (SSD), an USB flash, and a storage. Note that the storage device is not particularly limited in kind.

The driver database 55 may be a database that holds information regarding the driver who drives the vehicle 1. The information stored in the driver database 55 may include at least information regarding a driving skill of each driver and information regarding an experience level of each driver of operation authority transfer from the automatic driving to the manual driving.

In one example, the information regarding the driving skill of the driver may be data regarding a vehicle state that has been collected when each driver has manually driven the vehicle 1 in the past. For example, such data may be data obtained by performing multiple-level evaluation of a factor in each predetermined period. Non-limiting examples of the factor may include stability of a speed of the vehicle 1, a degree or a frequency of sudden acceleration or sudden deceleration, stability of a steering angle, and a degree or a frequency of sudden steering. Non-limiting examples of the predetermined period may include a period from the start to the end of the driving of the vehicle 1, a period to travel a predetermined distance, and a predetermined time. The driving skill of the driver may be evaluated more highly as the stability of the speed of the vehicle 1 is higher, as the degree of the sudden acceleration or the sudden deceleration is smaller, as the frequency of the sudden acceleration or the sudden deceleration is lower, as the stability of the steering angle is higher, as the degree of the sudden steering is higher, and as the frequency of the sudden steering is higher.

FIG. 3 illustrates an example of the information regarding the driving skill of the driver stored in the driver database 55. Evaluation items for the driving skill of the driver set in the example illustrated in FIG. 3 include the stability of the speed of the vehicle 1, the degree of the sudden acceleration or the sudden deceleration, the frequency of the sudden acceleration or the sudden deceleration, the stability of the steering angle, the degree of the sudden steering, and the frequency of the sudden steering in each predetermined period. The evaluation items for the driving skills may be evaluated in five levels. Each of the evaluation items may be evaluated as one of levels 1 to 5, where level 1 corresponds to the lowest evaluation and level 5 corresponds to the highest evaluation. Such evaluation results may be stored in the driver database 55.

In addition to the above, the information regarding the driving skill of the driver may include, for example, data of multiple-level evaluation of the driving skill based on data regarding an answer result collected from each driver. The answer result may be regarding, for example, a driving history, a driving frequency, a driving operation tendency, or preference for safe driving. In one example, the data regarding the answer result may be collected in advance by means of a questionnaire, or may be inputted in response to a question displayed by the HMI 43 or the like.

The information regarding the experience level of each driver of the operation authority transfer from the automatic driving to the manual driving may serve as an index that indicates how much each driver is used to the operation authority transfer from the automatic driving to the manual driving. The information regarding the experience level of the operation authority transfer may include, for example, data of the traveling stability of the vehicle 1 and the driving state of the vehicle 1 at a time when the operation authority transfer from the automatic driving to the manual driving has been executed while each driver has been driving the vehicle 1 in the past. For example, the data of the traveling stability of the vehicle 1 may include data regarding evaluation, during and after the operation authority transfer of the stability of the steering angle, the presence or absence of slipping of the wheels 3, a change in the longitudinal acceleration rate, or a change in the lateral acceleration rate. The data of the driving state of the vehicle 1 may include data regarding evaluation of, for example, the speed, the steering angle, the longitudinal acceleration rate, and the lateral acceleration rate of the vehicle 1 at the time of the operation authority transfer. The experience level of the operation authority transfer may be evaluated more highly as the traveling stability of the vehicle 1 at the time of the operation authority transfer is higher, as the speed of the vehicle 1 at the time of the operation authority transfer is higher, or as the lateral acceleration rate during turning is higher.

The information regarding the experience level of each driver of the operation authority transfer may include data regarding the number of times of the operation authority transfer from the automatic driving to the manual driving experienced by the driver. In this case, the experience level of the operation authority transfer may be evaluated more highly as the number of times of the experienced operation authority transfer is greater. The driver database 55 may accumulate data at the time when each driver has experienced the operation authority transfer in the past. In one example, the experience level of the operation authority transfer may be calculated on the basis of an average value of pieces of data accumulated regarding each driver. In another example, the experience level of the operation authority transfer may be calculated on the basis of an average value obtained from the predetermined number of latest pieces of data. For example, the experience level of the operation authority transfer of the driver may be evaluated as one of multiple levels on the basis of the pieces of data regarding each driver.

FIG. 4 illustrates an example of the information regarding the experience level of the driver of the operation authority transfer stored in the driver database 55. Evaluation items for the experience level of the driver of the operation authority transfer set in the example illustrated in FIG. 4 include: the stability of the steering angle, the presence or absence of slipping of the wheels 3, a change in the longitudinal acceleration rate, a change in the lateral acceleration rate, the speed of the vehicle 1, the steering angle, the longitudinal acceleration rate, and the lateral acceleration rate at the time of an operation authority transfer process; and the number of times of the experienced operation authority transfer. The evaluation items for the experience level of the operation authority transfer may be evaluated in five levels. Each of the evaluation items may be evaluated as one of levels 1 to 5, where level 1 corresponds to the lowest evaluation and level 5 corresponds to the highest evaluation. Such evaluation results may be stored in the driver database 55.

Note that although the example embodiment is described referring to an example in which the driver database 55 is provided in the control apparatus 50 mounted on the vehicle 1, this is non-limiting. In one example, the driver database 55 may be provided in a server outside the vehicle which is communicable by means of a mobile body communication system using a technique such as cloud computing. In addition, for example, the information regarding the driving skill of the driver and the information regarding the experience level of the operation authority transfer may be data accumulated in relation to a vehicle of the same type as the vehicle 1, or may be data accumulated in relation to two or more kinds of vehicles including the same type as the vehicle 1 in another example. A process of accumulating the information regarding the driving skill of the driver and the information regarding the experience level of the operation authority transfer will be described later in detail.

2-2. Detailed Configuration

The control apparatus 50 may be configured to control traveling of a vehicle by the automatic driving or the manual driving. As illustrated in FIG. 2, the controller 51 of the control apparatus 50 may include a driver detection unit 61, a surrounding-environment detection unit 63, a driving-state detection unit 65, a learning process unit 67, a driving-state determination unit 69, a difficulty-level determination unit 71, an authority transfer process unit 73, a driving-condition setting unit 75, and a driving control unit 77. These units may each be implemented by execution of a computer program by the one or more processors, such as the CPU or the CPUs. Note that a part or all of the controller 51 may be

[Driver Detection Unit]

The driver detection unit 61 may execute a process of detecting the driver who drives the vehicle 1 on the basis of image data received from the in-vehicle imaging camera 33. For example, the driver detection unit 61 may execute a process of recognizing a face of the driver sitting on a driver's seat on the basis of the image data received from the in-vehicle imaging camera 33. For example, the driver detection unit 61 may perform a feature amount extraction process on the recognized face of the driver, and determine whether data of the extracted feature amount is stored in the driver database 55.

In a case where the data of the extracted feature amount is not stored in the driver database 55, the driver detection unit 61 may give identification information to each recognized driver, and store the identification information, together with the data of the feature amount, in the driver database 55. In addition, the driver detection unit 61 may store the identification information identifying the detected driver in the storage 53. The identification information is not particularly limited, and may be data including numbers, symbols, etc., for example. In a case where the data of the extracted feature amount is stored in the driver database 55, the driver detection unit 61 may store the identification information identifying the detected driver in the storage 53.

[Surrounding-Environment Detection Unit]

The surrounding-environment detection unit 63 may detect the surrounding environment of the vehicle 1 on the basis of the detection data received from the surrounding environment sensor 31. For example, the surrounding-environment detection unit 63 may calculate a kind, a size (a width, a height, and a depth), and a position of an obstacle present around the vehicle 1; a distance from the vehicle 1 to the obstacle; and respective relative speeds of the vehicle 1 and the obstacle. The obstacle to be detected may include any object present around the vehicle 1. Non-limiting examples of such an obstacle may include another vehicle that is traveling, another vehicle that is stopped, a pedestrian, a bicycle, a sidewalk, a curb, a building, a utility pole, a traffic sign, a traffic light, and a nature object. The surrounding-environment detection unit 63 may also be configured to detect a lane or an end of a road. For example, the surrounding-environment detection unit 63 may detect a lane line on a road on the basis of detection data received from the surrounding environment sensor 31. Further, for example, the surrounding-environment detection unit 63 may be configured to detect a road surface state on the basis of image data received from the front imaging cameras 31LF and 31RF. Information regarding the road surface state may include information regarding a friction state of a road surface and information regarding an uneven state of the road surface. A method of detecting the road surface state is not particularly limited, and the road surface state may be detected by any publicly-known technique.

The surrounding-environment detection unit 63 may also be configured to detect a traveling environment such as a weather or brightness of image data. The information regarding the traveling environment to be detected may include information regarding, for example, a rainfall amount, a snowfall amount, or the brightness of the image data which can influence the reliability of the sensors used to collect various data to be used in a calculation process of the automatic driving. Such sensors may include, for example, the surrounding environment sensor 31 and the vehicle state sensor 35. For example, the information regarding the detected traveling environment may be information detected on the basis of the detection data received from the surrounding environment sensor 31, information acquired from a telematics system by means of a mobile body communication system, or information acquired from the outside of the vehicle 1 by means of vehicle-to-vehicle communication or road-to-vehicle communication.

[Driving-State Detection Unit]

The driving-state detection unit 65 may detect information regarding an operation state and behavior of the vehicle 1 on the basis of the detection data received from the vehicle state sensor 35. The driving-state detection unit 65 may acquire the information regarding the operation state and the behavior of the vehicle 1 at every predetermined calculation cycle, and store the acquired information in the storage 53. Non-limiting examples of the information regarding the operation state of the vehicle 1 may include a steering angle of the steering wheel 13 or the steered wheels, the accelerator operation amount, the brake operation amount, and the engine speed. Non-limiting examples of the information regarding the behavior of the vehicle 1 may include the vehicle speed, the longitudinal acceleration rate, the lateral acceleration rate, the yaw rate, and the number of rotations of the wheels 3.

[Learning Process Unit]

The learning process unit 67 may execute a process of collecting information regarding the driver and accumulating the collected information in the driver database 55. For example, the learning process unit 67 may collect the information regarding the driving skill of the driver upon the manual driving of the vehicle 1, and accumulate the collected information in the driver database 55. Upon execution of the process of transferring the operation authority of the vehicle 1 from the automatic driving to the manual driving, the learning process unit 67 may collect the information regarding the experience level of the driver of the operation authority transfer, and accumulate the collected information in the driver database 55.

[Driving-State Determination Unit]

The driving-state determination unit 69 may execute a process of determining whether the driving state involves difficulty in continuing the automatic driving upon the automatic driving of the vehicle 1. For example, the driving-state determination unit 69 may determine whether the driving state involves difficulty in continuing the automatic driving for a reason such as malfunctioning in the sensors including the surrounding environment sensor 31 and the vehicle state sensor 35, or a worsened weather.

[Difficulty-Level Determination Unit]

In a case where the driving-state determination unit 69 determines that the driving state involves difficulty in continuing the automatic driving, the difficulty-level determination unit 71 may execute a process of determining the difficulty level of the operation authority transfer from the automatic driving to the manual driving on the basis of the information regarding the surrounding environment of the vehicle 1, the information regarding the driving skill of the driver, and the information regarding the experience level of the driver of the operation authority transfer. In the example embodiment, the difficulty-level determination unit 71 may comprehensively determine the difficulty level of the operation authority transfer on the basis of respective results of multiple-level evaluation for the surrounding environment of the vehicle 1, the driving skill of the driver, and the experience level of the driver of the operation authority transfer. The multiple-level evaluation may be, for example, five-level evaluation. In one example of the example embodiment, the difficulty-level determination unit 71 may determine the difficulty level of the operation authority transfer further using information regarding the driving state of the vehicle 1 such as an inclination of a road, a curvature of a traveling road, or the speed of the vehicle 1.

[Authority Transfer Process Unit]

The authority transfer process unit 73 may execute a process of setting a driving-state condition for executing the operation authority transfer in accordance with the difficulty level of the operation authority transfer determined by the difficulty-level determination unit 71, and of executing the operation authority transfer in a case where the set driving-state condition is satisfied. For example, the authority transfer process unit 73 may set a maximum vehicle speed and a maximum steering angle at the time of the operation authority transfer in accordance with the difficulty level of the operation authority transfer. The authority transfer process unit 73 may so execute the process as to transfer the operation authority in a driving state securing higher safety, as the difficulty level of the operation authority transfer is higher. In addition, the authority transfer process unit 73 may set a time to complete the operation authority transfer in accordance with the difficulty level of the operation authority transfer. Hereinafter, the time to complete the operation authority transfer is also referred to as a "transition time". The authority transfer process unit 73 may set the transition time to be longer as the difficulty level of the operation authority transfer is higher to execute the process of the operation authority transfer. In one example, the authority transfer process unit 73 may set a timing of the operation authority transfer from the automatic driving to the manual driving to be later as the driving skill of the driver is higher.

[Driving-Condition Setting Unit]

The driving-condition setting unit 75 may execute a process of setting respective control target values for driving the driving force source 9, the electric steering system 15, and the brake device 20. Hereinafter, the respective control target values for driving the driving force source 9, the electric steering system 15, and the brake device 20 may collectively be referred to as "control target values of a vehicle". Upon the automatic driving of the vehicle 1, the driving-condition setting unit 75 may set the first control target values, for example, on the basis of information regarding respective risk potentials set for objects, including obstacles and lanes around the vehicle 1. The risk potentials may each be a risk value that has a maximum value corresponding to a range within which an object such as the obstacle is present, and that is set to be smaller as a distance from the object such as the obstacle is greater. The risk potentials may each thus represent a risk that the vehicle 1 comes into contact with the object such as the obstacle.

For example, the driving-condition setting unit 75 may set a target track and a target vehicle speed that minimize the risk that vehicle 1 comes in contact with the object such as the obstacle, on the basis of information regarding a traveling route set by an automatic driving control and the information regarding the risk potential. The driving-condition setting unit 75 may calculate a target acceleration rate (acceleration and deceleration rates) and a target steering angular velocity on the basis of the set target track and the set target vehicle speed, and set respective first control target values for driving the driving force source 9, the electric steering system 15, and the brake device 20. Upon the automatic driving, such first control target values may be set as the control target values of the vehicle 1.

Upon the manual driving of the vehicle 1, the driving-condition setting unit 75 may set second control target values on the basis of information regarding the accelerator operation amount, the brake operation amount, and the steering angle of the steering wheel 13 derived from the operation by the driver. The information regarding the accelerator operation amount, the brake operation amount, and the steering angle of the steering wheel 13 derived from the operation by the driver may be detected by the vehicle state sensor 35. For example, the driving-condition setting unit 75 may calculate the target acceleration rate (acceleration and deceleration rates) and the target steering angular velocity on the basis of the information regarding the accelerator operation amount, the brake operation amount, and the steering angle of the steering wheel 13, and set respective second control target values for driving the driving force source 9, the electric steering system 15, and the brake device 20. Upon the manual driving, such second control target values may be set as the control target values of the vehicle 1.

In the case where the driving-state determination unit 69 determines that the driving state involves difficulty in continuing the automatic driving, the driving-condition setting unit 75 may execute a process of performing the operation authority transfer from the automatic driving to the manual driving in accordance with the transition time set by the authority transfer process unit 73. For example, in a period from the start of the operation authority transfer process to the elapse of the transition time, the driving-condition setting unit 75 may gradually decrease a rate at which the first control target values, set by the automatic driving, are to be reflected to the control target values of the vehicle 1 (100/100→0/100) while gradually increasing a rate at which the second control target values, set by the manual driving, are to be reflected to the control target values of the vehicle 1 (0/100→100/100), thereby executing the operation authority transfer. Note that, in the example embodiment, the driving-condition setting unit 75 may be configured to set, in a case where the second control target values set by the manual driving exceed the first control target values set by the automatic driving, the second control target values set by the manual driving as the control target values of the vehicle 1 and complete the operation authority transfer.

[Driving Control Unit]

The driving control unit 77 may execute a process of controlling driving of the driving force source 9, the electric steering system 15, and the brake device 20 on the basis of the respective control target values set by the driving-condition setting unit 75.

2-3. Operation Examples

The configuration of the control apparatus 50 has been described above. Next, a description is given of operation examples of a control process to be executed by the control apparatus 50 according to the example embodiment.

Figure 5:
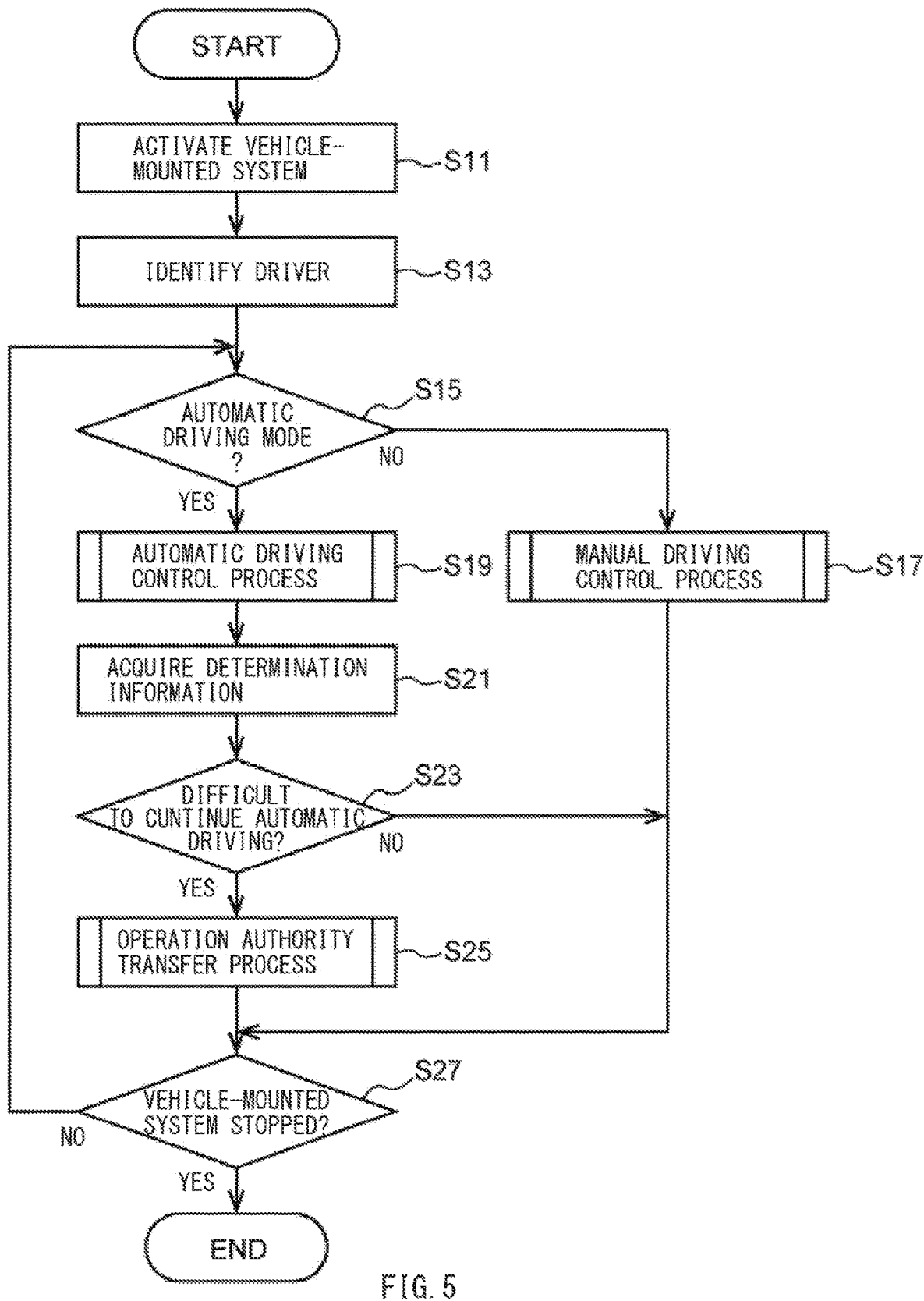
FIG. 5 is a flowchart illustrating an example of a main routine of a control process to be executed by the vehicle control apparatus according to one example embodiment.

FIG. 5 is a flowchart illustrating an example of a main routine of the control process for the vehicle 1 to be executed by the control apparatus 50.

First, the vehicle-mounted system including the control apparatus 50 may be activated (step S11). Upon the activation of the vehicle-mounted system including the control apparatus 50, the driver detection unit 61 of the controller 51 may execute a process of identifying a driver (step S13). For example, the driver detection unit 61 may execute a face recognition process with use of the image data received from the in-vehicle imaging camera 33 to thereby detect an occupant sitting on the driver's seat. In addition, the driver detection unit 61 may perform a feature amount extraction process on a face of the occupant sitting on the driver's seat and refer to the data of the feature amount accumulated in the driver database 55 to thereby identify the driver. The driver detection unit 61 may store the identification information regarding the identified driver in the storage 53. If the driver database 55 does not have the data of the driver of interest, the driver detection unit 61 may give identification information to the data of the extracted feature amount, and store the identification information, together with the data of the extracted feature amount, in the driver database 55. The driver detection unit 61 may also store the identification information identifying the detected driver in the storage 53.

Thereafter, the driving-condition setting unit 75 of the controller 51 may determine whether the driving mode of the vehicle 1 is the automatic driving mode (step S15). For example, the driving-condition setting unit 75 may determine whether a switching switch for the driving mode is set to the automatic driving mode. For example, the driving mode may be configured to be switchable on the basis of operation input performed by an occupant of the vehicle 1. If the vehicle 1 is not in the automatic driving mode (step S15: NO), the controller 51 may execute a manual driving control process (step S17).

Figure 6:
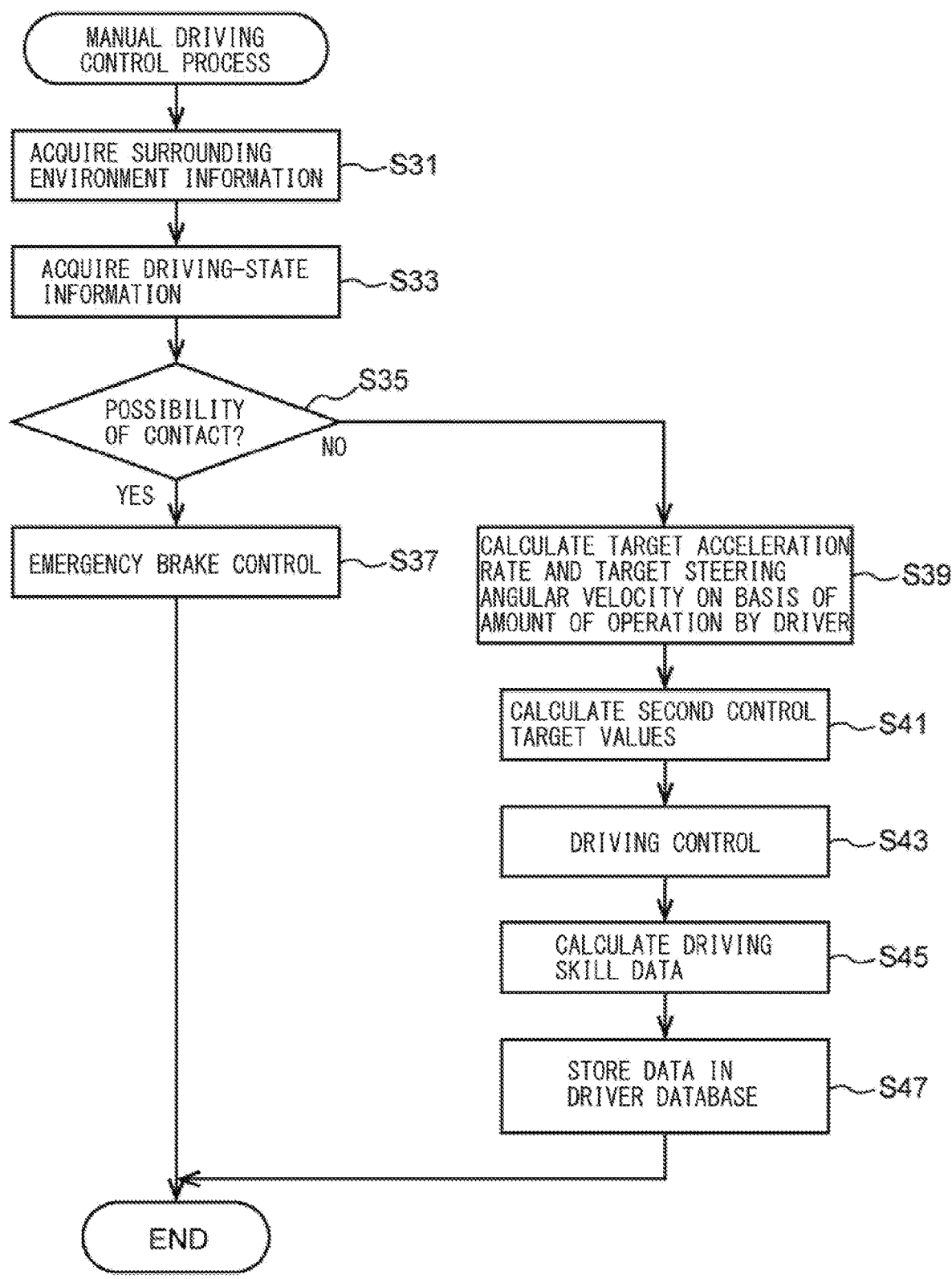
FIG. 6 is a flowchart illustrating an example of an operation in a manual driving control process to be executed by the vehicle control apparatus according to one example embodiment.

FIG. 6 is a flowchart illustrating an example of an operation in the manual driving control process to be executed in step S17 of FIG. 5.

In the manual driving control process, the surrounding-environment detection unit 63 of the controller 51 may execute a process of acquiring the information regarding the surrounding environment of the vehicle 1 (step S31). For example, the surrounding-environment detection unit 63 may detect an obstacle present around the vehicle 1 on the basis of the detection data received from the surrounding environment sensor 31. Further, the surrounding-environment detection unit 63 may calculate a position, a kind, and a size (a width, a height, and a depth) of the detected obstacle; a distance from the vehicle 1 to the obstacle; and respective relative speeds of the vehicle 1 and the obstacle. The obstacle to be detected may include any object present around the vehicle 1. Non-limiting examples of such an obstacle may include another vehicle that is traveling, another vehicle that is stopped, a pedestrian, a bicycle, a sidewalk, a curb, a building, a utility pole, a traffic sign, a traffic light, and a nature object.

For example, the surrounding-environment detection unit 63 may perform image processing on the image data received from the front imaging cameras 31LF and 31RF to thereby detect the obstacle in front of the vehicle 1 and the kind of the object by means of a technique such as a pattern matching technique. Further, the surrounding-environment detection unit 63 may calculate the position of the obstacle viewed from the vehicle 1, the size of the obstacle viewed from the vehicle 1, and the distance to the obstacle on the basis of information regarding a position of the obstacle in the image data, the size of the obstacle occupying the image data, and a parallax between the left and right front imaging cameras 31LF and 31RF. Further, the surrounding-environment detection unit 63 may calculate a time derivative of a variation in distance to thereby calculate the respective relative speeds of the vehicle 1 and the obstacle.

In one example, the surrounding-environment detection unit 63 may detect the obstacle on the basis of the detection data received from the LiDAR 31S. For example, the surrounding-environment detection unit 63 may calculate the position, the kind, and the size of the obstacle, and the distance to the obstacle on the basis of information regarding a time from transmission of an electromagnetic wave from the LiDAR 31S to reception of a reflected wave, a direction of the reception of the reflected wave, and a range of a measured point cloud of the reflected wave. Further, for example, the surrounding-environment detection unit 63 may calculate the time derivative of the variation in distance to thereby calculate the respective relative speeds of the vehicle 1 and the obstacle. Further, for example, the surrounding-environment detection unit 63 may acquire information regarding the obstacle in front of the vehicle 1 on the basis of information regarding the position of the vehicle 1 on the map data acquired by means of the GPS sensor 37 and the information regarding the position of the obstacle acquired by means of communication with the outside of the vehicle 1.

Further, the surrounding-environment detection unit 63 may detect a lane or an end of a road on the basis of the detection data received from the surrounding environment sensor 31. For example, the surrounding-environment detection unit 63 may perform image processing on the image data received from the front imaging cameras 31LF and 31RF to thereby detect the lane or the end of the road by means of a technique such as a pattern matching technique. In another example, the surrounding-environment detection unit 63 may acquire information regarding the lane on which the vehicle 1 is traveling or the end of the road on which the vehicle 1 is traveling, on the basis of information regarding the position of the vehicle 1 on the map data acquired by means of the GPS sensor 37.

Further, the surrounding-environment detection unit 63 may detect the traveling environment such as a weather or brightness of the image data on the basis of the detection data received from the surrounding environment sensor 31. For example, the surrounding-environment detection unit 63 may detect information regarding a rainfall amount, a snowfall amount, and the brightness of the image data which can influence the reliability of the sensors used to collect various data to be used in a calculation process of the automatic driving. Such sensors may include, for example, the surrounding environment sensor 31 and the vehicle state sensor 35. The rainfall amount, the snowfall amount, etc. can influence detection accuracy of the front imaging cameras 31LF and 31RF, the rear imaging camera 31R, or the LiDAR 31S. The brightness of the image data can influence the detection accuracy of the front imaging cameras 31LF and 31RF or the rear imaging camera 31R.

The surrounding-environment detection unit 63 may acquire the information regarding the traveling environment, for example, on the basis of the detection data received from the surrounding environment sensor 31. In one example, the surrounding-environment detection unit 63 may detect the rainfall amount, the snowfall amount, or the brightness of the image data on the basis of the image data received from the front imaging cameras 31LF and 31RF by a publicly-known technique. In another example, the surrounding-environment detection unit 63 may detect the rainfall amount or the snowfall amount by means of a raindrop sensor. Further, for example, the surrounding-environment detection unit 63 may detect the brightness of the image data by means of an illuminance sensor. For example, the surrounding-environment detection unit 63 may acquire the information regarding the traveling environment from a telematics system by means of a mobile body communication system. For example, the surrounding-environment detection unit 63 may acquire the information regarding the traveling environment from the outside of the vehicle 1 by means of vehicle-to-vehicle communication or road-to-vehicle communication.

Thereafter, the driving-state detection unit 65 of the controller 51 may execute a process of acquiring the information regarding the operation state and the behavior of the vehicle 1 on the basis of the detection data received from the vehicle state sensor 35 (step S33). For example, the driving-state detection unit 65 may acquire the information regarding the operation state such as the steering angle of the steering wheel 13 or the steered wheels, the accelerator operation amount, the brake operation amount, or the engine speed, and the information regarding the behavior of the vehicle 1 such as the vehicle speed, the longitudinal acceleration rate, the lateral acceleration rate, the yaw rate, or the number of rotations of the wheels 3.

Thereafter, the driving-condition setting unit 75 of the controller 51 may determine whether there is a possibility that the vehicle 1 comes into contact with an object such as an obstacle, on the basis of the acquired information regarding the surrounding environment, the acquired information regarding the operation state of the vehicle 1, and the acquired information regarding the behavior of the vehicle 1 (step S35). For example, the driving-condition setting unit 75 may predict contact between the vehicle 1 and the obstacle on the basis of information regarding a distance to the obstacle present in a traveling direction of the vehicle 1, the respective relative speeds of the object and the vehicle 1, the speed of the vehicle 1, and the acceleration and deceleration rates of the vehicle 1. Note that a method of determining a possibility of the contact between the vehicle 1 and the obstacle is not particularly limited.

If it is determined that there is a possibility that the vehicle 1 comes into contact with the object such as the obstacle (step S35: YES), the driving-condition setting unit 75 may activate an emergency brake control (step S37). For example, the driving-condition setting unit 75 may generate an instruction to activate the emergency brake control, and the driving control unit 77 may cause the brake device 20 to operate in accordance with the generated instruction to perform sudden braking of the vehicle 1. In a case where the driving force source 9 includes a drive motor, the drive motor may be caused to perform regeneration to thereby generate braking force while the brake device 20 is controlled.

If it is not determined that there is a possibility that the vehicle 1 comes into contact with the object such as the obstacle (step S35: NO), the driving-condition setting unit 75 may calculate the target acceleration rate (acceleration and deceleration rates) and the target steering angular velocity of the vehicle 1 on the basis of the information regarding the accelerator operation amount, the brake operation amount, and the steering angle of the steering wheel 13 derived from the operation by the driver (step S39). Thereafter, the driving-condition setting unit 75 may calculate the respective second control target values for driving the driving force source 9, the electric steering system 15, and the brake device 20 on the basis of the calculated target acceleration rate and the calculated target steering angular velocity (step S41). A method of calculating the control target values for driving the driving force source 9, the electric steering system 15, and the brake device 20 on the basis of the target acceleration rate and the target steering angular velocity is not particularly limited.

Thereafter, the driving control unit 77 of the controller 51 may control the driving of the driving force source 9, the electric steering system 15, and the brake device 20 on the basis of the respective second control target values set by the driving-condition setting unit 75, to thereby control the driving of the vehicle 1 (step S43).

Thereafter, the learning process unit 67 of the controller 51 may calculate data regarding the driving skill of the manual driving of the driver (step S45). For example, upon the manual driving, the learning process unit 67 may calculate the stability of the speed of the vehicle 1, the degree of the frequency of the sudden acceleration or the sudden deceleration, the stability of the steering angle, or the degree or the frequency of the sudden steering in each predetermined period. Regarding the stability of the speed, the number of times of repetitive increase and decrease in speed in a short time may be counted, and multiple-level evaluation of the stability of the speed may be performed on the basis of the number of times of the repetitive increase and decrease in speed in the short time. Regarding the degree of the sudden acceleration or the sudden deceleration, multiple-level ranges of the acceleration rate or the deceleration rate may be set in advance. The degree of the sudden acceleration or the sudden deceleration may be evaluated on the basis of which of the multiple-level ranges of the acceleration rate or the deceleration rate the maximum value of the acceleration rate or the deceleration rate in the predetermined period falls in. The multiple-level evaluation of the frequency of the sudden acceleration or the sudden deceleration may be performed on the basis of the number of times the acceleration rate or the deceleration rate exceeds a predetermined threshold in the predetermined period.

Regarding the stability of the steering angle, the number of times of repetitive swinging of the steering angle in a short time may be counted, and multiple-level evaluation of the stability of the steering angle may be performed on the basis of the number of times of the repetitive swinging of the steering angle in the short time. Regarding the degree of the sudden steering, multiple-level ranges of the angular velocity may be set in advance. The degree of the sudden steering may be evaluated on the basis of which of the multiple-level ranges the maximum value of the steering angular velocity in the predetermined period falls in. The multiple-level evaluation of the frequency of the sudden steering may be performed on the basis of the number of times the steering angular velocity exceeds a predetermined threshold in the predetermined period. In the example embodiment, the stability of the speed of the vehicle 1, the degree of the frequency of the sudden acceleration or the sudden deceleration, the stability of the steering angle, or the degree or the frequency of the sudden steering in each predetermined period may be evaluated in five levels (see FIG. 3). For example, the predetermined period may be a period from the start to the end of the driving of the vehicle 1, a period to travel any predetermined distance, or any predetermined time.

Note that the kind of the data related to the driving skill of the driver and the method of calculating each piece of data are not limited to the above-described examples. In one example, the driving skill of the driver may be evaluated on the basis of another data which reflects the driving skill of the driver.

Thereafter, the learning process unit 67 may store the calculated data related to the driving skill of the driver in the driver database 55 in association with the identification information of the driver (step S47). Note that the learning process unit 67 may store, in the driver database 55, data of the driving skill evaluated in one of the multiple levels, for example, on the basis of the data of the answer result collected from each driver. The answer result may be regarding, for example, a driving history, a driving frequency, a driving operation tendency, or preference for safe driving.

As described above, during the manual driving mode, the control apparatus 50 may set the driving condition of the vehicle 1 in accordance with the driving operation performed by the driver and control the driving of the vehicle 1. In addition, in a case where there is a possibility that the vehicle 1 comes into contact with an obstacle, the control apparatus 50 may cause sudden braking of the vehicle 1 to be performed. In the example embodiment, the control apparatus 50 may calculate the data related to the driving skill of the driver on the basis of the information regarding the operation state of the vehicle 1 or the behavior of the vehicle 1 derived from the operation by the driver upon the manual driving, and store the calculated data in the driver database 55. It is thereby possible to collect the data related to the driving skill of the driver on the basis of the data at the time when each driver actually drives the vehicle 1.

Note that the process of calculating the data related to the driving skill of the driver in step S45 and the process of storing the data in the driver database 55 in step S47 are not necessarily executed in real time during the driving of the vehicle 1. For example, such processes may be executed at the end of the manual driving mode or before stopping of the vehicle-mounted system.

Referring again to FIG. 5, the manual driving control process in step S17 may continuously be executed unless the vehicle-mounted system is determined as being stopped in step S27 or unless the driving mode of the vehicle 1 is determined as the automatic driving mode in step S15.

In contrast, if the driving mode of the vehicle 1 is determined as the automatic driving mode in step S15 (step S15: YES), the controller 51 may execute the automatic driving control process (step S19).

Figure 7:
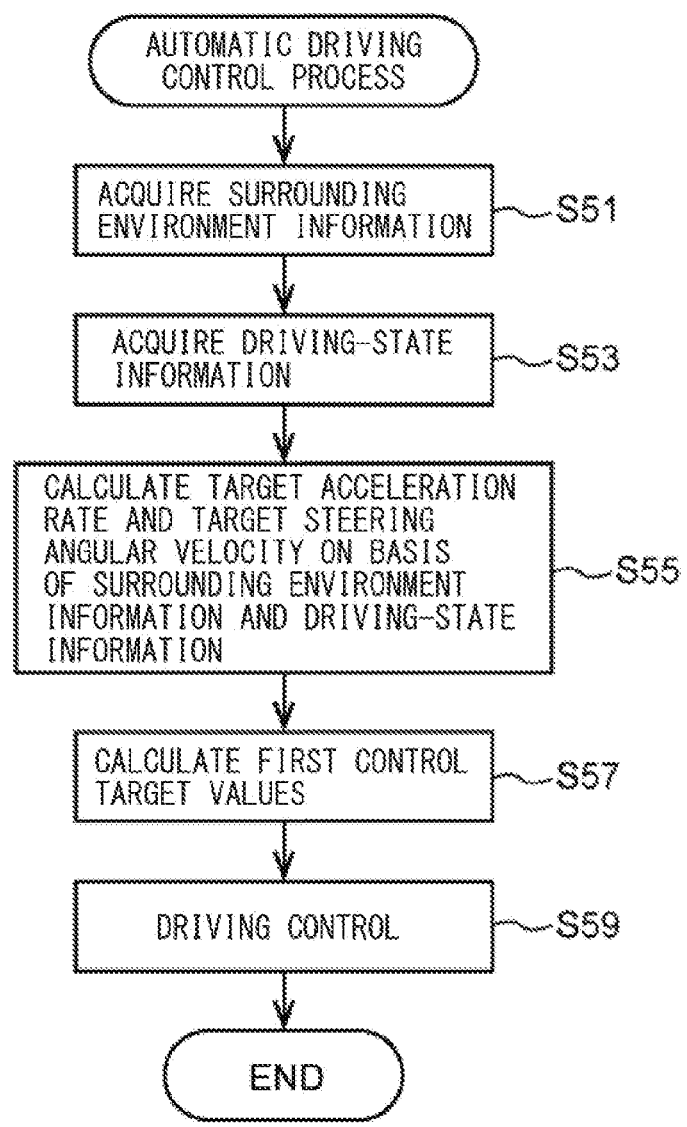
FIG. 7 is a flowchart illustrating an example of an operation in an automatic driving control process to be executed by the vehicle control apparatus according to one example embodiment.

FIG. 7 is a flowchart illustrating an example of an operation in the automatic driving control process in step S19 of FIG. 5.

In the automatic driving control process, the surrounding-environment detection unit 63 may execute a process of acquiring the information regarding the surrounding environment of the vehicle 1 (step S51). Thereafter, the driving-state detection unit 65 may execute a process of acquiring the information regarding the operation state or the behavior of the vehicle 1 (step S53). The processes in steps S51 and S53 may be executed in a similar manner to the above-described processes in steps S31 and S33, respectively.

Thereafter, the driving-condition setting unit 75 may calculate the target acceleration rate (acceleration and deceleration rates) and the target steering angular velocity of the vehicle 1 on the basis of the acquired information regarding the surrounding environment and the acquired information regarding the driving state (step S55). For example, the driving-condition setting unit 75 may set the control target values of the vehicle 1 on the basis of the information regarding the risk potential set for each of the objects, including the obstacle and the lane around the vehicle 1. For example, the driving-condition setting unit 75 may set the target track and the target vehicle speed that minimize the risk that the vehicle 1 comes into contact with the object such as the obstacle, on the basis of the information regarding the traveling route and the information regarding the risk potential. Note that a method of calculating the target acceleration rate and the target steering angular velocity at the time of the automatic driving control is not limited to a method using the risk potential.

Thereafter, the driving-condition setting unit 75 may calculate the respective first control target values for driving the driving force source 9, the electric steering system 15, and the brake device 20 on the basis of the calculated target acceleration rate and the calculated target steering angular velocity (step S57). A method of calculating the respective control target values for the driving force source 9, the electric steering system 15, and the brake device 20 on the basis of the target acceleration rate and the target steering angular velocity is not particularly limited. Thereafter, the driving control unit 77 of the controller 51 may control driving of the driving force source 9, the electric steering system 15, and the brake device 20 on the basis of the respective first control target values set by the driving-condition setting unit 75, to thereby control the driving of the vehicle 1 (step S59).

Referring again to FIG. 5, during the execution of the automatic driving control process, the driving-state determination unit 69 may acquire information for determining whether the driving state involves difficulty in continuing the automatic driving (step S21). Hereinafter, the information for determining whether the driving state involves difficulty in continuing the automatic driving is also referred to as "determination information". The determination information may include, for example, information regarding presence or absence of malfunctioning of the sensors, including the surrounding environment sensor 31 and the vehicle state sensor 35. For example, the determination information may include information regarding presence or absence of an output from each of the sensors, information regarding presence or absence of an abnormal value of the output from each of the sensors, and information regarding a determination result in a case where each of the sensors is configured to perform self-determination. The determination information may further include information that can influence the reliability of the sensors. For example, the determination information may include information regarding, for example, the rainfall amount, the snowfall amount, or the brightness of the image data that can influence the reliability of the sensors. Note that the determination information is not limited to the above-described examples, and may include any other information.

Thereafter, the driving-state determination unit 69 may determine whether the driving state involves difficulty in continuing the automatic driving on the basis of the acquired determination information (step S23). Although a determination method is not particularly limited, for example, the driving-state determination unit 69 may determine the driving state as involving difficulty in continuing the automatic driving in a case where the acquired determination information includes information indicating malfunctioning of any of the sensors. In addition, in a case where the rainfall amount, the snowfall amount, or the like is determined as great, or in a case where the brightness of the image data of the front imaging cameras 31LF and 31RF is excessively high, the driving-state determination unit 69 may determine that the driving state involves difficulty in continuing the automatic driving because of low reliability of the data acquired by the device such as the front imaging cameras 31LF and 31RF or the LiDAR 31S.

If the driving state is not determined as involving difficulty in continuing the automatic driving (step S23: NO), the automatic driving control process may be continuously executed as long as the vehicle-mounted system is not determined as being stopped in step S27 and the driving mode of the vehicle 1 is determined as the automatic driving mode in step S15. If the driving state is determined as involving difficulty in continuing the automatic driving (step S23: YES), the controller 51 may execute a process of transferring the operation authority from the automatic driving to the manual driving (step S25).

Figure 8:
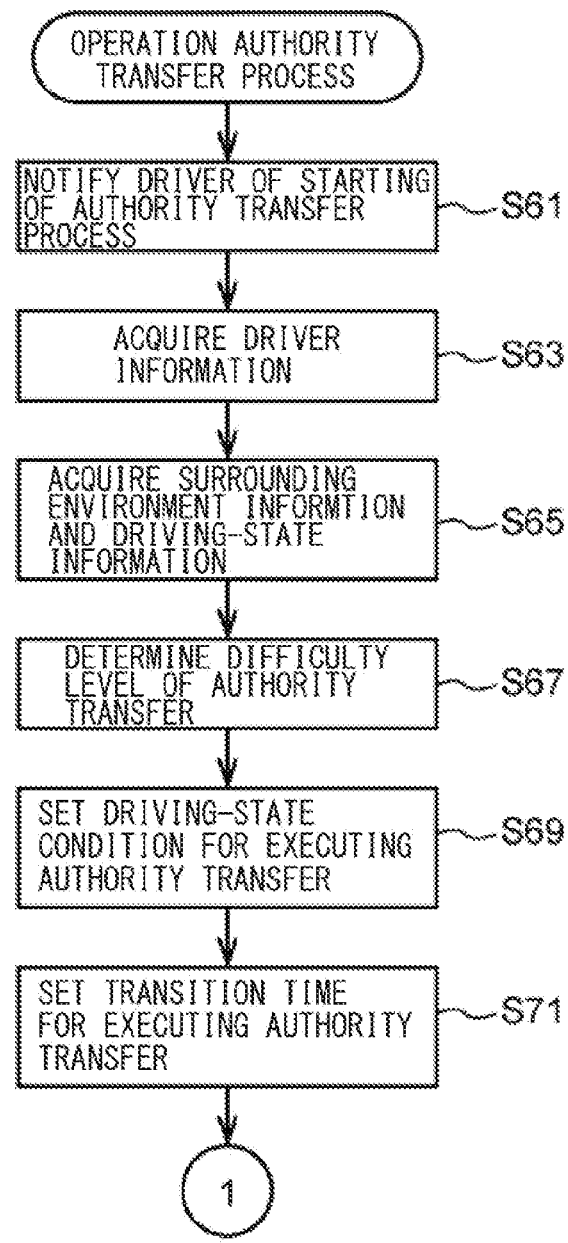
FIG. 8 is a flowchart illustrating an example of an operation in an operation authority transfer process to be executed by the vehicle control apparatus according to one example embodiment.
Figure 9:
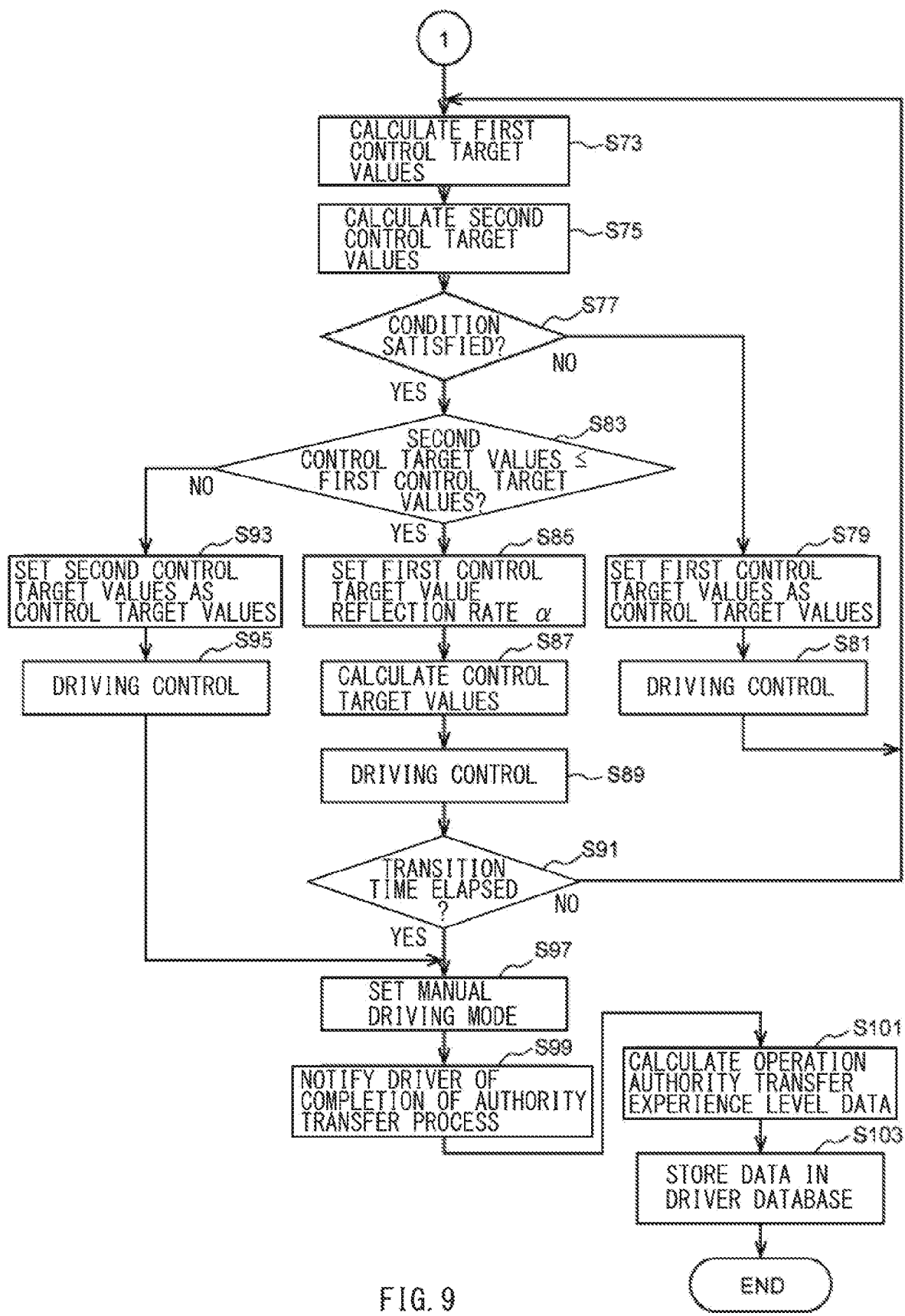
FIG. 9 is a flowchart illustrating an example of the operation in the operation authority transfer process to be executed by the vehicle control apparatus according to one example embodiment.

FIGS. 8 and 9 are each a flowchart illustrating an example of an operation in the operation authority transfer process in step S25 of FIG. 5.

First, the authority transfer process unit 73 may execute a process of notifying the driver that the driving state involves difficulty in continuing the automatic driving and that the process of transferring the operation authority from the automatic driving to the manual driving is to be started (step S61). For example, the authority transfer process unit 73 may drive the HMI 43 to notify the driver of the starting of the operation authority transfer process outputting sound and displaying an image.

Thereafter, the difficulty-level determination unit 71 may acquire the information regarding the driving skill of the driver and the information regarding the experience level of the driver of the operation authority transfer stored in the driver database 55 (step S63). For example, the difficulty-level determination unit 71 may acquire, from the driver database 55, information regarding the driving skill and information regarding the experience level of the operation authority transfer that are associated with the identification information of the current driver of the vehicle 1. Thereafter, the difficulty-level determination unit 71 may execute a process of acquiring the information regarding the surrounding environment of the vehicle 1 acquired by the surrounding-environment detection unit 63 and the information regarding the operation state and the behavior (the driving state) of the vehicle 1 acquired by the driving-state detection unit 65 (step S65).

Thereafter, the difficulty-level determination unit 71 may execute a process of determining the difficulty level of the operation authority transfer from the automatic driving to the manual driving on the basis of the acquired information regarding the surrounding environment of the vehicle 1, the acquired information regarding the driving skill of the driver, and the acquired information regarding the experience level of the driver of the operation authority transfer (step S67). As illustrated in FIGS. 3 and 4, in the example embodiment, the driver database 55 may hold the data of the evaluation items regarding the driving skill of the driver that each have been evaluated in five levels by the learning process unit 67, and the data of the evaluation items regarding the experience level of the driver of the operation authority transfer. In one example, the difficulty-level determination unit 71 may use, as the evaluation result of the driving skill, the average value of the respective level values of the evaluation items for the driving skill of the driver, and may use, as the evaluation result of the experience level of the operation authority transfer, the average value of the respective level values of the evaluation items for the experience level of the driver of the operation authority transfer. In another example, the difficulty-level determination unit 71 may use, as the evaluation result of the driving skill, the maximum value or the minimum value of the respective level values of the evaluation items for the driving skill of the driver, and may use, as the evaluation result of the experience level of the operation authority transfer, the maximum value or the minimum value of the respective level values of the evaluation items for the experience level of the driver of the operation authority transfer. In this case, the respective evaluation items may be weighted.

Further, the difficulty-level determination unit 71 may determine, on the basis of the acquired information regarding the surrounding environment of the vehicle 1, at least one of the risk potential of the object such as the obstacle around the vehicle 1, the kind of the object such as the obstacle, the road surface state, the inclination of the road, or the curvature of the traveling road, and perform five-level evaluation of the surrounding environment for executing the operation authority transfer process. In one example, the difficulty-level determination unit 71 may perform five-level evaluation of each of the above-described factors in the surrounding environment on the basis of a predetermined determination criterion, and use an average value of the evaluation of the respective factors as the evaluation result of the surrounding environment. In another example, the difficulty-level determination unit 71 may use the maximum value or the minimum value of the evaluation of the factors as the evaluation result of the surrounding environment. In this case, the respective evaluation factors may be weighted. Further, for example, the factor to be evaluated may include the information regarding the speed of the vehicle 1. Note that in the example embodiment, the surrounding environment may be evaluated as one of levels 1 to 5, where level 1 corresponds to a surrounding environment having the lowest difficulty level evaluation and level 5 corresponds to a surrounding environment having the highest difficulty level evaluation.

The difficulty-level determination unit 71 may multiple the acquired level value of the driving skill by the acquired level value of the experience level of the operation authority transfer and the acquired level value of the surrounding environment to thereby obtain the difficulty level of the operation authority transfer. To give an example, in a case where the level value of the driving skill is 4, the level value of the experience level of the operation authority transfer is 3, and the level value of the surrounding environment is 2, the difficulty level of the operation authority transfer is determined as 24. However, a method of determining the difficulty level of the operation authority transfer is not limited to a method of multiplying the level values. In one example, the minimum value or the maximum value of the level values may be determined as the difficulty level of the operation authority transfer.

Figure 10:
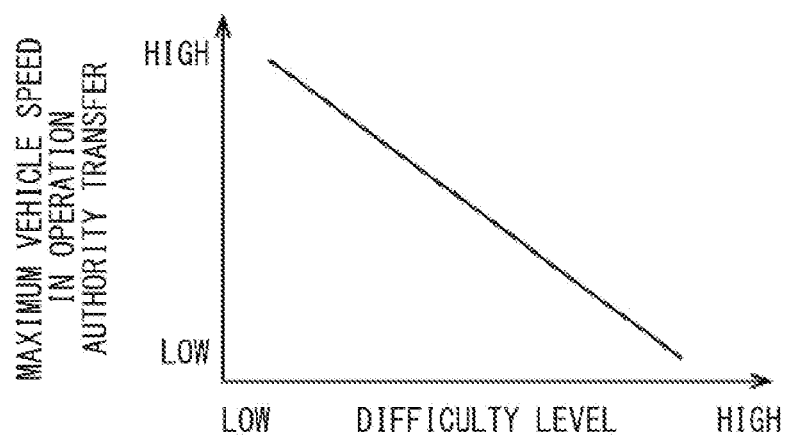
FIG. 10 is an explanatory diagram illustrating an example of a maximum vehicle speed at the time of the operation authority transfer which is set in accordance with a difficulty level.
Figure 11:
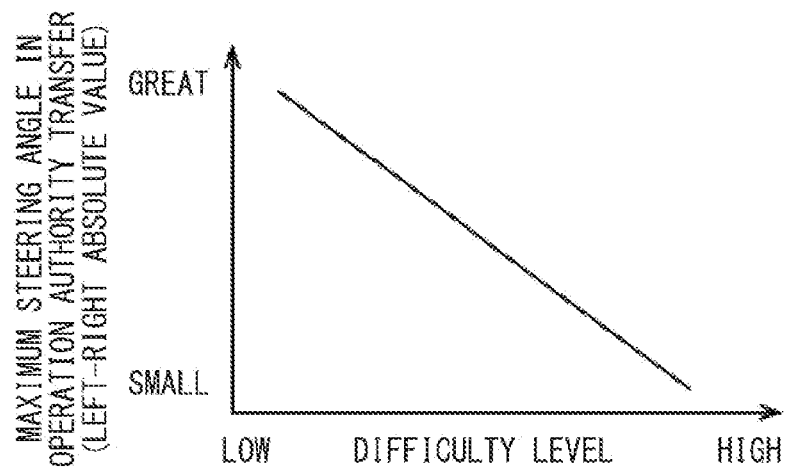
FIG. 11 is an explanatory diagram illustrating an example of a maximum steering angle at the time of the operation authority transfer which is set in accordance with the difficulty level.

Thereafter, the authority transfer process unit 73 may set a driving-state condition for executing the operation authority transfer in accordance with the difficulty level determined by the difficulty-level determination unit 71 (step S69). Further, the authority transfer process unit 73 may set a transition time from the start to the completion of the operation authority transfer in accordance with the difficulty level determined by the difficulty-level determination unit 71 (step S71). As illustrated in FIGS. 10 and 11, as the difficulty level is higher, the maximum vehicle speed (an allowable value of the vehicle speed) in executing the operation authority transfer may be set lower, and the maximum steering angle (an allowable value of the steering angle) in executing the operation authority transfer may be set smaller. In contrast, as the difficulty level is lower, the maximum vehicle speed (the allowable value of the vehicle speed) in executing the operation authority transfer may be set higher, and the maximum steering angle (an allowable value of the steering angle) in executing the operation authority transfer may be set greater. It is thus possible to prevent the driving mode from being switched to the manual driving while the vehicle 1 is traveling at a high vehicle speed or traveling on a curved road with a small curvature in a situation with a high difficulty level of the operation authority transfer. For example, in a case where the driving skill of the driver is low, the operation authority transfer from the automatic driving to the manual driving may be executed while the vehicle 1 is traveling straight at a low speed.

Thereafter, the driving-condition setting unit 75 may calculate the respective first control target values for driving the driving force source 9, the electric steering system 15, and the brake device 20 by the automatic driving in accordance with the above-described procedure from steps S51 to S57 (step S73). Thereafter, the driving-condition setting unit 75 may calculate the respective second control target values for driving the driving force source 9, the electric steering system 15, and the brake device 20 on the basis of the accelerator operation amount, the brake operation amount, and the steering angle of the steering wheel 13 derived from the operation by the driver in accordance with the above-described procedure in steps S39 and S41 (step S75).

Thereafter, the authority transfer process unit 73 may determine whether the driving-state condition set in step S69 is satisfied (step S77). If the driving-state condition is not satisfied (step S77: NO), the driving-condition setting unit 75 may set the first control target values as the control target values of the vehicle 1 (step S79). Thereafter, the driving control unit 77 may control the driving of the driving force source 9, the electric steering system 15, and the brake device 20 on the basis of the respective control target values set by the driving-condition setting unit 75 to thereby control the driving of the vehicle 1 (step S81). Thereafter, the process may be returned to step S73. That is, the automatic driving control process that does not reflect the driving operation of the driver may be continued.

In contrast, if the driving-state condition is satisfied (step S77: YES), the driving-condition setting unit 75 may determine whether the second control target values are less than or equal to the first control target values (step S83). If the second control target values are less than or equal to the first control target values (step S83: YES), the driving-condition setting unit 75 may set a rate α at which the first control target values are to be reflected to the control target values of the vehicle 1 (step S85). The rate α may be so set as to gradually decrease from 100/100 to 0/100 in accordance with an elapsed time in a period from a timing when the driving-state condition is satisfied in step S77 and the operation authority transfer process is started to a timing when the transition time set in step S71 elapses.

Thereafter, the driving-condition setting unit 75 may set the control target values of the vehicle 1 on the basis of the first control target values, the second control target values, and the rate α (step S87). The control target values to be calculated may be expressed by the following expression.

Control target values of vehicle 1=first control target values×α+second control target values×(1−α)

A speed to gradually decrease the rate α may be constant or may be varied. For example, the speed to gradually decrease the rate α may be increased in accordance with an increase in elapsed time from the start of the operation authority transfer process.

Thereafter, the driving control unit 77 may control the driving of each of the driving force source 9, the electric steering system 15, and the brake device 20 on the basis of the control target values set by the driving-condition setting unit 75 to thereby control the driving of the vehicle 1 (step S89). After the operation authority transfer process is started, the driving operation of the driver may gradually be reflected in the driving state of the vehicle 1.

After the driving control is executed in step S89, the authority transfer process unit 73 may determine whether the elapsed time from the timing when the driving-state condition is satisfied in step S77 and the operation authority transfer process is started has reached the transition time set in step S71 (step S91). If the elapsed time has reached the transition time (step S91: YES), the authority transfer process unit 73 may set the driving mode of the vehicle 1 to the manual driving mode, and end the operation authority transfer process (step S97). Thereafter, the authority transfer process unit 73 may execute a process of notifying the driver of the completion of the operation authority transfer process (step S99). This allows the driver to recognize the switching of the driving mode to the manual driving mode.

If the elapsed time has not reached the transition time yet (step S91: NO), the process may be returned to step S73, and the processes in the respective steps described above may be repeated to thereby gradually transfer the operation authority of the vehicle 1 from the automatic driving to the manual driving. While the operation authority is being transferred, in a case where the second control target values exceed the first control target values in step S83 (step S83: NO), the driving-condition setting unit 75 may set the second control target values calculated on the basis of the driving operation of the driver as the control target values of the vehicle 1 even before the elapsed time from the timing when the operation authority transfer process is started reaches the transition time (step S93). This allows the driving mode to be swiftly switched to the manual driving mode in a case where the driving operation by the driver becomes able to follow the operation amount based on the automatic driving control.

Thereafter, the driving control unit 77 may control the driving of the driving force source 9, the electric steering system 15, and the brake device 20 on the basis of the respective control target values set by the driving-condition setting unit 75, to thereby control the driving of the vehicle 1 (step S95). Thereafter, the authority transfer process unit 73 may set the driving mode of the vehicle 1 to the manual driving mode, and end the operation authority transfer process (step S97). Thereafter, the authority transfer process unit 73 may execute a process of notifying the driver of the completion of the operation authority transfer process (step S99). This allows the driver to recognize that the driving mode has been switched to the manual driving mode.

Thereafter, the learning process unit 67 may calculate data related to the experience level of the operation authority transfer on the basis of data acquired during the execution of the operation authority transfer process (step S101). For example, the learning process unit 67 may calculate the traveling stability of the vehicle 1 on the basis of the data regarding the operation state and the behavior of the vehicle 1 acquired in a period from the start to the end of the operation authority transfer. For example, the learning process unit 67 may calculate the stability of the steering angle, the presence or absence of slipping of the wheels 3, the change in the longitudinal acceleration rate, and the change in the lateral acceleration rate, the speed of the vehicle 1, the steering angle, the longitudinal acceleration rate, and the lateral acceleration rate during the execution of the operation authority transfer process.

Evaluation of the stability of the steering angle may be executed in accordance with the evaluation of the stability of the steering angle executed in step S45. Regarding evaluation of the presence or absence of slipping of the wheels 3, multiple-level ranges of a slip rate may be set in advance. The presence or absence of slipping of the wheels 3 may be evaluated on the basis of which of the multiple-level ranges a slip rate of the wheels 3 detected during the execution of the operation authority transfer process falls in. Evaluation of the change in the longitudinal acceleration rate and the change in the lateral acceleration rate may be executed in accordance with the evaluation of the degree or the frequency of the sudden acceleration or the sudden deceleration executed in step S45. Regarding evaluation of the speed of the vehicle 1, the steering angle, the longitudinal acceleration rate, and the lateral acceleration rate, multiple-level ranges thereof may be set in advance. The speed of the vehicle 1, the steering angle, the longitudinal acceleration rate, and the lateral acceleration rate may be evaluated on the basis of which of the multiple-level ranges the average value or the maximum value of the values falls in. In the example embodiment, each of the evaluation items related to the experience level of the operation authority transfer may be evaluated in five levels (see FIG. 4).

Further, the learning process unit 67 may count up the number of times of the experienced operation authority transfer. For example, the learning process unit 67 may add "1" to the number of times of the operation authority transfer experienced by the driver stored in the driver database 55. That is, as the number of times of the experienced operation authority transfer is greater, the evaluation may result in a higher level. In the example embodiment, the number of times of the experienced operation authority transfer may be evaluated in five levels in accordance with a preset range of the number of times (see FIG. 4).

Note that the data related to the experience level of the driver of the operation authority transfer is not limited to the examples described above. In one example, the experience level of the driver of the operation authority transfer may be evaluated on the basis of any other data that reflects the experience level of the driver of the operation authority transfer.

Thereafter, the learning process unit 67 may store the calculated data related to the experience level of the driver of the operation authority transfer in the driver database 55 in association with the identification information of the driver (step S103).

The process may be returned to FIG. 5, and after the operation authority transfer process in step S25 ends, the driving-condition setting unit 75 may determine whether the vehicle-mounted system has stopped (step S27). If the vehicle-mounted system has not stopped yet (step S27: NO), the process may be returned to step S15, and the processes in the steps described above may be repeatedly executed. In contrast, if the vehicle-mounted system has already stopped (step S27: YES), the control apparatus 50 may stop the operation of the control process of the vehicle 1.

As described above, the control apparatus 50 according to the example embodiment transfers the operation authority of the vehicle 1 from the automatic driving to the manual driving in a case where the driving state involves difficulty in continuing the automatic driving during the automatic driving of the vehicle 1. On this occasion, the control apparatus 50 determines the difficulty level of the operation authority transfer on the basis of the information regarding the surrounding environment of the vehicle 1, the information regarding the driving skill of the driver, and the information regarding the experience level of the driver of the operation authority transfer. Further, the control apparatus 50 executes the process of the operation authority transfer in a case where the driving-state condition set in accordance with the difficulty level is satisfied. This makes it possible to set the driving-state condition in accordance with the ability of each driver to adapt to the switching from the automatic driving to the manual driving, thereby allowing for safe transfer of the operation authority. In one example, the information to be used in determining the difficulty level may include information regarding the traveling stability of the vehicle 1 at time of the operation authority transfer in the past, the number of times of the experienced operation authority transfer, or both of each driver. Thus, for a driver having a low experience level of the operation authority transfer process, the condition to execute the operation authority transfer process may be so set as to allow the operation authority transfer to be executed in a safer driving state.

Moreover, the control apparatus 50 according to the example embodiment may be configured to accumulate, in the driver database 55, the data of the evaluation of the driving skill of the driver at the time of the manual driving and the experience level of the driver of the operation authority transfer. This makes it possible to collect information regarding the driving skill of the driver and the experience level of the driver of the operation authority transfer on the basis of the actual driving operation performed by the driver, and to use the collected information in setting the condition to execute the operation authority transfer process. This makes it possible to more appropriately set the driving-state condition in accordance with the ability of each driver to adapt to the switching from the automatic driving to the manual driving, thereby allowing for safe transfer of the operation authority.

Moreover, in a case where the second control target values set on the basis of the driving operation performed by the driver exceeds the first control target values set by the automatic driving control during the operation authority transfer process, the control apparatus 50 according to the example embodiment may set the second control target values as the control target values of the vehicle 1 and complete the operation authority transfer. This makes it possible to swiftly switch the driving mode to the manual driving after the driving operation by the driver becomes able to follow the operation amount set by the automatic driving control, thus making it possible to reduce the driver's feeling of strangeness.

In the above description, some example embodiments of the technology are described in detail with reference to the accompanying drawings. However, it should be appreciated that the example embodiments of the technology described above are merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

For example, in the example embodiment described above, all the units of the control apparatus 50 may be provided in the vehicle 1; however, the technology is not limited to such an example. In one example, some of the units of the control apparatus 50 may be provided in a server communicable by means of a mobile body communication system, and the control apparatus 50 may be configured to perform transmission and reception of data with respect to the server.

The following examples are each also regarded as belonging to the technical scope of the technology.

A vehicle control apparatus, in which, in a case where the second control target values set by the manual driving exceed the first control target values set by the automatic driving after a process of the operation authority transfer is started, the one or more processors may set the second control target values set by the manual driving as the control target values and complete the operation authority transfer.

The vehicle control apparatus, in which, in a case where the difficulty level of the operation authority transfer is determined as being high, the one or more processors may set a steering-angle condition of the driving-state condition for executing the operation authority transfer to a straight-traveling state, and cause the automatic driving to continue until the vehicle is brought to the straight-traveling state.

A vehicle control apparatus to be applied to a vehicle having a driving mode that is switchable between automatic driving and manual driving, the vehicle control apparatus including:
   a driving-state detection unit configured to determine whether a driving state involves difficulty in continuing the automatic driving;
   a difficulty-level determination unit configured to determine, in a case where the driving state is determined as involving difficulty in continuing the automatic driving, a difficulty level of operation authority transfer from the automatic driving to the manual driving on a basis of information regarding a surrounding environment of the vehicle, information regarding a driving skill of a driver who drives the vehicle, and information regarding an experience level of the driver of the operation authority transfer from the automatic driving to the manual driving, and
   a transfer process unit configured to set a driving-state condition for executing the operation authority transfer in accordance with the difficulty level, and execute the operation authority transfer in a case where the driving-state condition is satisfied.

A computer program and a recording medium in which the computer program is stored, the computer program being to be applied to a vehicle having a driving mode that is switchable between automatic driving and manual driving, the computer program causing a processor to execute an operation including
   executing determination as to whether a driving state involves difficulty in continuing the automatic driving,
   in a case where the driving state is determined as involving difficulty in continuing the automatic driving, executing determination on a difficulty level of operation authority transfer from the automatic driving to the manual driving on a basis of information regarding a surrounding environment of the vehicle, information regarding a driving skill of a driver who drives the vehicle, and information regarding an experience level of the driver of the operation authority transfer from the automatic driving to the manual driving,
   setting a driving-state condition for executing the operation authority transfer in accordance with the difficulty level, and
   executing the operation authority transfer in a case where the driving-state condition is satisfied.

Each of the driver detection unit 61, the surrounding-environment detection unit 63, the driving-state detection unit 65, the learning process unit 67, the driving-state determination unit 69, the difficulty-level determination unit 71, the authority transfer process unit 73, the driving-condition setting unit 75, and the driving control unit 77 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the driver detection unit 61, the surrounding-environment detection unit 63, the driving-state detection unit 65, the learning process unit 67, the driving-state determination unit 69, the difficulty-level determination unit 71, the authority transfer process unit 73, the driving-condition setting unit 75, and the driving control unit 77 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the driver detection unit 61, the surrounding-environment detection unit 63, the driving-state detection unit 65, the learning process unit 67, the driving-state determination unit 69, the difficulty-level determination unit 71, the authority transfer process unit 73, the driving-condition setting unit 75, and the driving control unit 77 illustrated in FIG. 2.

The invention claimed is:

1. A vehicle control apparatus to be applied to a vehicle having a driving mode that is switchable between automatic driving and manual driving, the vehicle control apparatus comprising:
   one or more processors; and
   one or more memories communicably coupled to the one or more processors,
   the one or more processors being configured to;
      execute determination as to whether a driving state of the vehicle involves difficulty in continuing the automatic driving;
      in a case where the driving state is determined as involving difficulty in continuing the automatic driving, execute determination on a difficulty level of operation authority transfer from the automatic driving to the manual driving on a basis of information regarding a surrounding environment of the vehicle, information regarding a driving skill of a driver who drives the vehicle, and information regarding an experience level of the driver of the operation authority transfer from the automatic driving to the manual driving;
      execute setting of a driving-state condition for executing the operation authority transfer in accordance with the difficulty level; and
      execute the operation authority transfer from the automatic driving to the manual driving in a case where the driving-state condition is satisfied,
   wherein the driving-state condition includes a reference speed of the vehicle and a reference steering angle of the vehicle,
   wherein the one or more processors is further configured to:

set the reference speed and the reference steering angle based on the difficulty level; and in response to determining that the speed of the vehicle and the steering angle of the vehicle are equal to or less than the reference speed and the reference steering angle, respectively, execute the operation authority transfer from the automatic driving to the manual driving.

2. The vehicle control apparatus according to claim 1, wherein the information regarding the experience level of the operation authority transfer includes one or both of information regarding how many times the driver has experienced the operation authority transfer and information regarding traveling stability of the vehicle at time of the operation authority transfer.

3. The vehicle control apparatus according to claim 1, wherein the one or more processors are configured to execute the determination of the difficulty level of the operation authority transfer further on a basis of information regarding the driving state of the vehicle.

4. The vehicle control apparatus according to claim 1, wherein the one or more processors are configured to:

execute the operation authority transfer by gradually decreasing a rate at which a first control target value is to be reflected to a control target value of the vehicle while gradually increasing a rate at which a second control target value is to be reflected to the control target value of the vehicle, the first control target value being set for the automatic driving, the second control target value being set for the manual driving; and set a time to complete the operation authority transfer on a basis of the difficulty level.

5. The vehicle control apparatus according to claim 1, wherein the one or more processors are configured to cause a condition for the determination as to whether the driving state involves difficulty in continuing the automatic driving to be variable in accordance with the driving skill of the driver, and set a timing of the operation authority transfer from the automatic driving to the manual driving to be later as the driving skill of the driver is higher.

6. The vehicle control apparatus according to claim 1, wherein the one or more processors are configured to:

determine the reference speed such that the reference speed becomes lesser as the difficulty level becomes higher; and determine the reference steering angle such that the steering angle becomes lesser as the difficulty level becomes higher.

7. The vehicle control apparatus according to claim 6, wherein the information regarding the experience level of the operation authority transfer includes information regarding how many times the driver has experienced the operation authority transfer, and wherein the one or more processors are configured to determine the difficulty level such that the difficulty level becomes higher as a number of times the driver has experienced the operation authority transfer becomes greater.

8. A vehicle control apparatus to be applied to a vehicle having a driving mode that is switchable between automatic driving and manual driving, the vehicle control apparatus comprising:

one or more processors; and one or more memories communicably coupled to the one or more processors, the one or more processors being configured to:

determine an experience level of a driver of operation authority transfer from the automatic driving to the manual driving;

determine a reference speed of the vehicle and a reference steering angle of the vehicle based on the experience level;

execute determination as to whether a driving state of the vehicle involves difficulty in continuing the automatic driving;

in a case where the driving state is determined as involving difficulty in continuing the automatic driving, determine whether a speed of the vehicle and a steering angle of the vehicle are equal to or less than the reference speed and the reference steering angle; and in response to determining that the speed of the vehicle and the steering angle of the vehicle are equal to or less than the reference speed and the reference steering angle, respectively, execute the operation authority transfer from the automatic driving to the manual driving.

* * * * *